343-909 SR
12/30/80  XR  4,242,578

United States Patent [19]
Britz

[11] 4,242,578
[45] Dec. 30, 1980

[54] OPTO-ELECTRONIC ANTENNA SYSTEM

[76] Inventor: Hans E. Britz, Ludwig-Quidde-Str. 23, 6000 Frankfurt am Main 56, Fed. Rep. of Germany

[21] Appl. No.: 717,388

[22] Filed: Aug. 24, 1976

Related U.S. Application Data

[63] Continuation-in-part of Ser. No. 651,809, Jan. 23, 1976, Pat. No. 4,099,879.

[30] Foreign Application Priority Data

Aug. 25, 1975 [DE] Fed. Rep. of Germany ....... 2537723

[51] Int. Cl.$^2$ ............................................ H04B 9/00
[52] U.S. Cl. .................................. 455/611; 343/909; 343/753; 358/901
[58] Field of Search ............... 250/199, 227; 343/909, 343/753, 100 SA, 115, 720, 721, 754; 356/141, 152; 350/22, 213, 179, 32, 167; 358/901

[56] References Cited
U.S. PATENT DOCUMENTS 4,062,043  12/1977  Zeidler et al. .................. 250/199

Primary Examiner—Robert L. Griffin
Assistant Examiner—Edward L. Coles
Attorney, Agent, or Firm—Craig and Antonelli

[57] ABSTRACT

An opto-electronic antenna system includes a plurality of transmitting/receiving antennas disposed over a prescribed geometric surface such as a sphere. The antenna units are scanned electronically according to their position on the geometrical surface by supplying to the individual units, signals differing in phase in accordance with the position of the antenna with which the units are associated both in the vertical and horizontal directions. An evaluation circuit is provided for determining the direction of received radiation. The antennas are constructed of a multitude of lens elements having a hexagonal shape. By suitable design, a surveillance radar system is constructed.

12 Claims, 34 Drawing Figures n = 8 n = 8

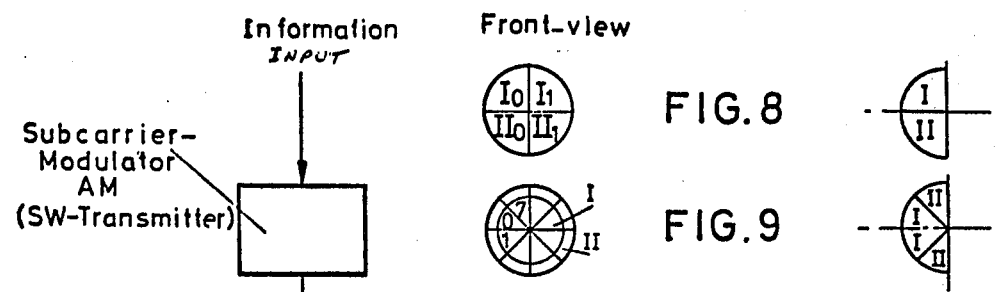
FIG. 8
FIG. 9
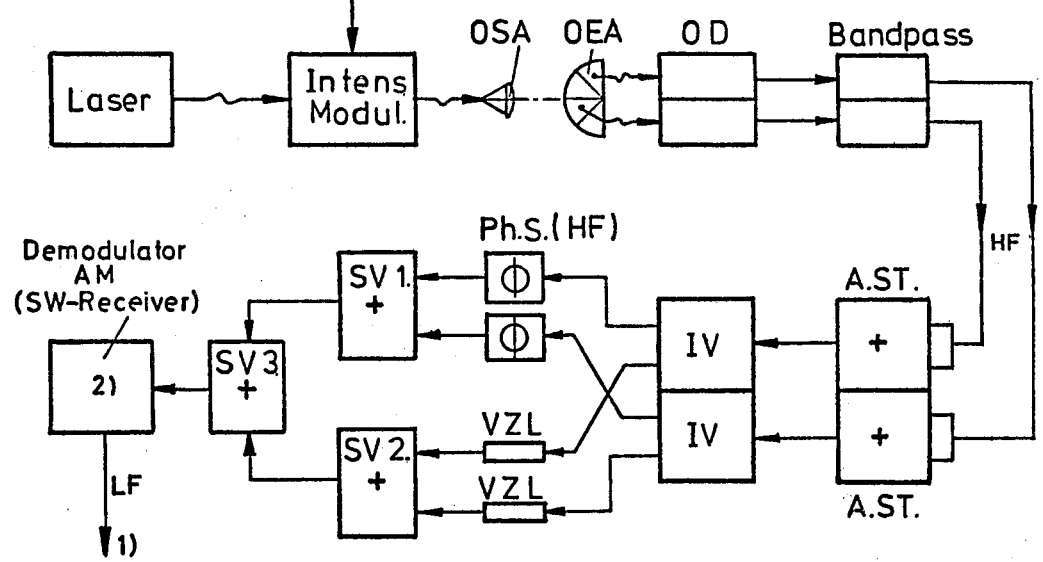
FIG. 10
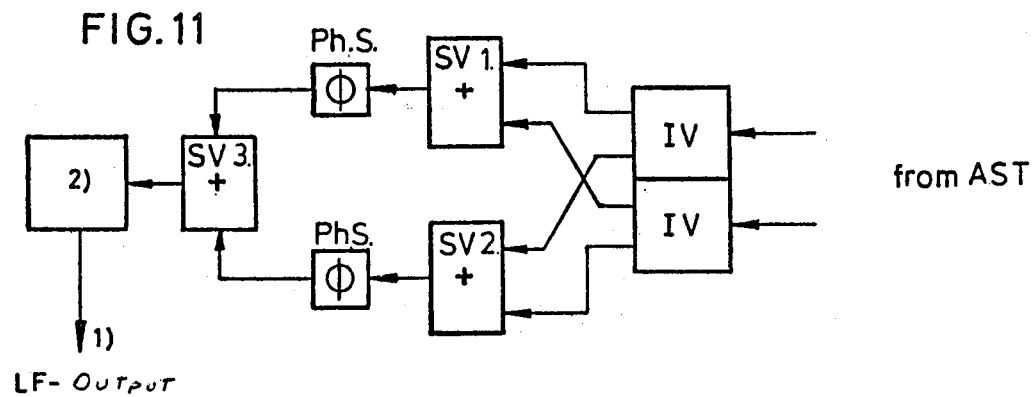
FIG. 11 filling

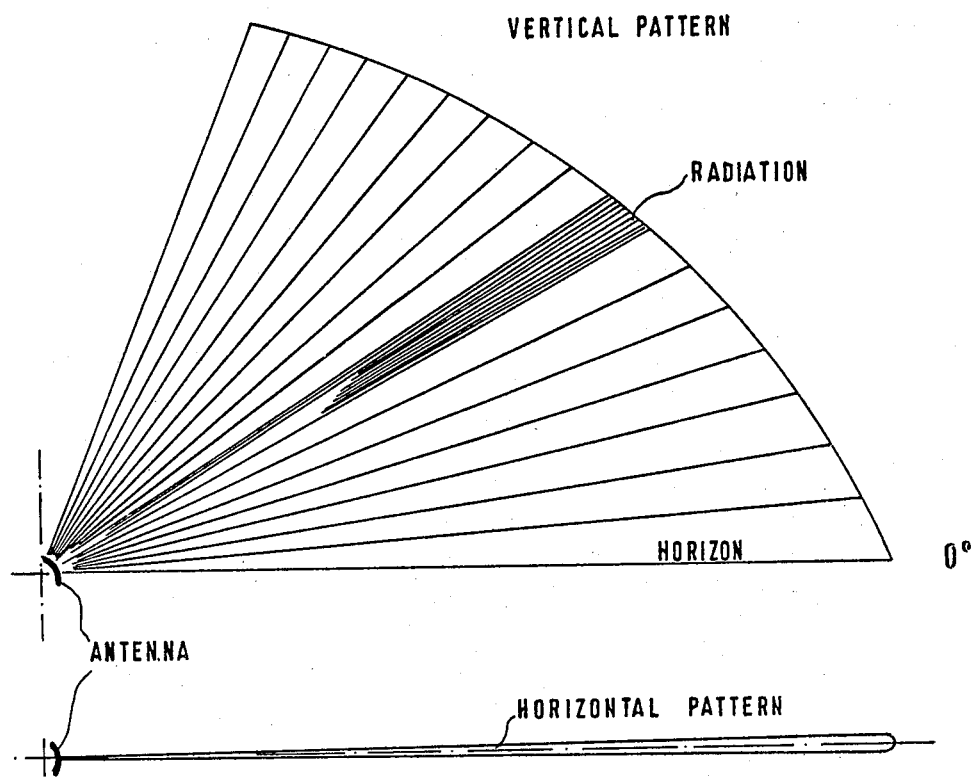
FIG. 22
FIG. 23
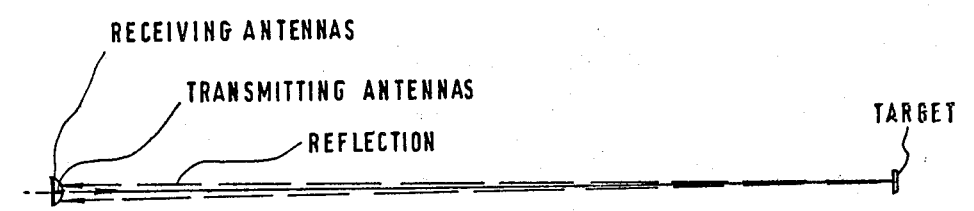
FIG. 24
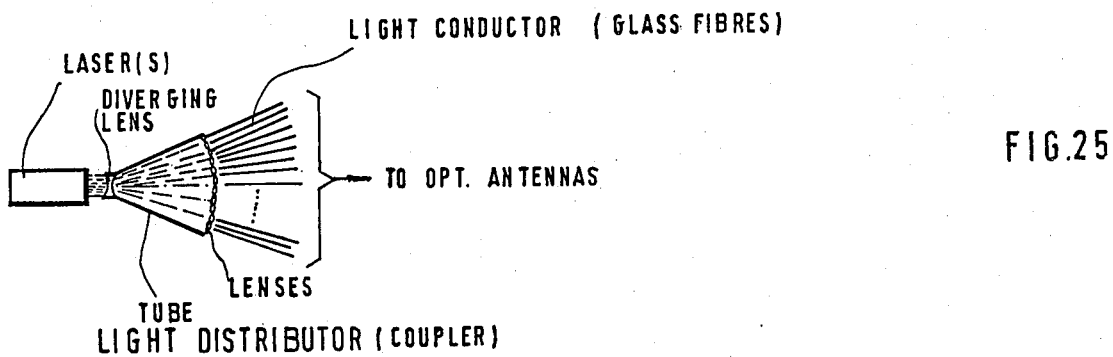
FIG. 25

SIDE VIEW

TOP VIEW

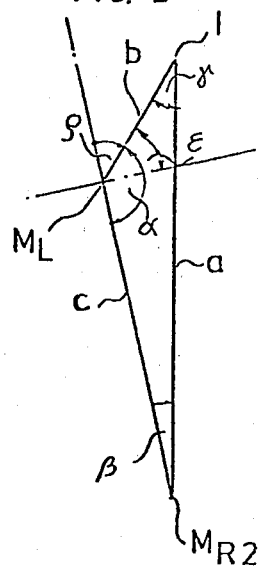
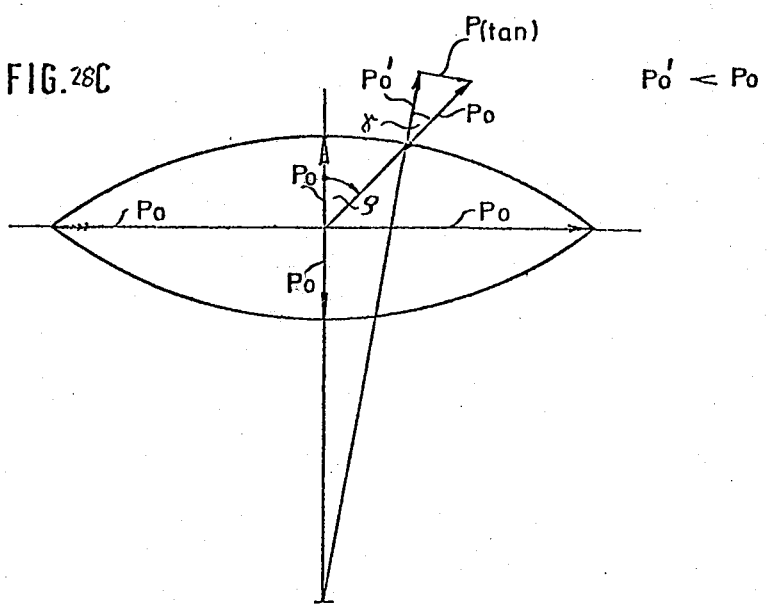

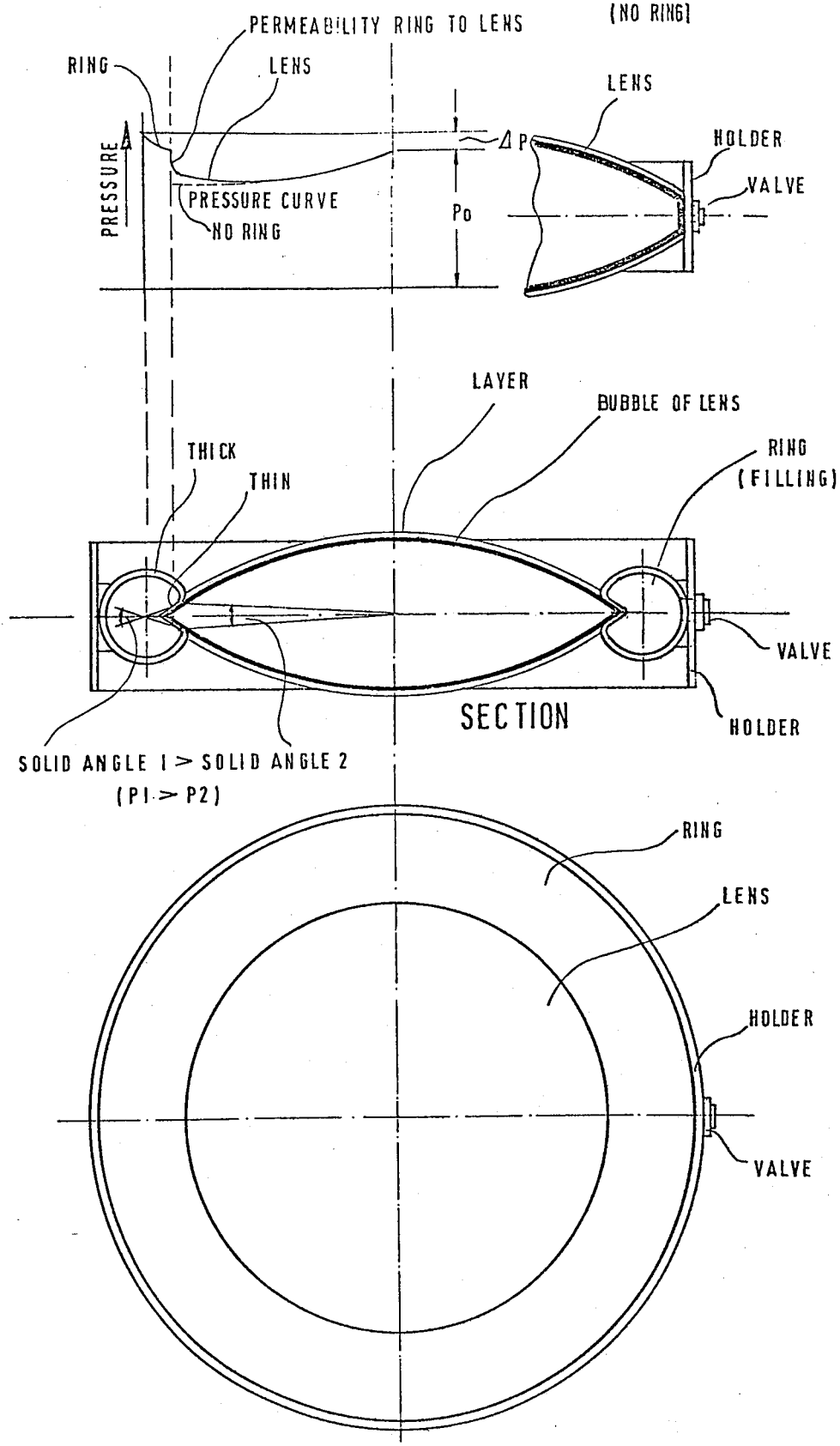

OPTO-ELECTRONIC ANTENNA SYSTEM

CROSS REFERENCES TO RELATED APPLICATIONS

This is a continuation in part of U.S. application Ser. No. 651,809, filed Jan. 23, 1976, now U.S. Pat. No. 4,099,879, the subject matter of which is incorporated by reference herein.

BACKGROUND OF THE INVENTION

1. Field of the Invention

The present invention relates to an opto-electric antenna system configuration and its application with respect to communication transmission systems and surveillance radar systems.

2. Description of the Prior Art

Directional antennas have been employed for wireless communications (at high frequencies) and for measurements in the field of radio-technology. Such directional antennas can be fixedly arranged (for use in connection with directional radio) or rotatably mounted (for radar applications). Moreover, of late, laser technology, which is presently undergoing substantial development, has employed the use of various types of optical antennas.

However, in the present state of the art, three-dimensional space scanning techniques have not yet been satisfactorily mastered in radar technology, since for one thing, the scanning velocity is quite low, and it is very difficult to increase the same, due to the rotation of the antennas and the pulse time delay involved. For an explanation of radar technology, attention may be directed to the periodical entitled "VDI Nachrichten" (German Engineer's Association News) No. 48,1972, particularly the chapter entitled "Complicated Third Dimension" Radar Symposium in Ulm.

In the field of laser technology, extremely high standards must be satisfied with respect to the positional stability of both the transmitting and the receiving antennas and the practical usefulness is, accordingly, limited. For an explanation of laser technology in this respect, attention is directed to the publication entitled "Lasers", by Klaus Tradowsky, Vogel Publishers, p. 127, as well as the periodical entitled "Rundfunktechnische Mitteilungen" (Radio Communication News) Vol. 16, No. 6, p. 291, 1972.

OBJECTS OF THE INVENTION

It is an object of the present invention to effect a very rapid three-dimensional, space scanning operation by means of a stationary, non-rotatable, opto-electric antenna system which employs laser beams and which overcomes the problem of the prior art.

It is another object of the present invention to provide an opto-electric antenna system utilizing the spatial direction finding of laser beams and beams having similar propagation characteristics, reflected pulses, foreign pulses, as well as pulse sequences of transponders with the aid of an electronic evaluation circuit. system can be constructed.

As opposed to the familiar rotation principle with a concave antenna reflector, the applicant makes use of a spherically shaped effective antenna surface, formed by a large number of small stacked arrays, e.g. optical antennas or coil antennas (for microwave).

This system represents an alternative, offering, with less technical expenditure, the same accuracy of measurement as the stationary system already patented, i.e. a system entailing considerable lower costs, but at the same time possessing the ideal prerequisites for application of the monopulse technique and surpassing the already familiar monopulse principle in elevation evaluation, since no servo-motor is required for the vertical direction.

BRIEF SUMMARY OF THE INVENTION

In accordance with the present invention, optical or opto-electronic antennas, having solid angles with respect to one another, are arranged so that a spherical-type characteristic is produced, formed by the apertures of the antennas (optical).

The opto-electronic antenna system is sub-divided along longitudinal and latitudinal lines, and the optical or opto-electronic antennas are disposed at the points of the intersections of these longitudinal and latitudinal lines. The fineness of the subdivisions depends upon the accuracy requirements which the opto-electronic system must meet.

Moreover, the outputs of all of the optical and/or opto-electronic antennas, which are arranged within a solid angle component of $\phi$ degrees in the horizontal and vertical directions, are correlated with a common receiver.

These antenna outputs are modulated and shifted in phase with respect to one another, so that each solid angle component is associated with a specific phase position for purposes of identification. The resultant phase position is formed in accordance with magnitude and direction by a subsequent amplitude selection, according to the magnitude and phase and a subsequent electronic addition of two adjacent, selected, solid angle components. As a result, it is possible to determine, in a simple electronic manner, even without the use of a transponder, the solid angle, by means of an individual and, moreover, fixedly disposed antenna arrangement.

The opto-electronic antenna system, can, moreover, be spherical or similar to a sphere in shape, or it can consist of fragments of such shapes, or it may be composed of a plurality of such fragments. The individual optical and/or opto-electronic antennas can have, for each latitude (or portion thereof) different or additional antenna aperture diameters. In this regard, conventional optical antenna configurations may be employed.

As a result of the present invention, it is possible to attain a higher space scanning velocity than in the case of prior art radar systems. Moreover, as was mentioned previously, since the antennas are fixed, the use of moving parts is avoided. Also, since a large number of lasers may be available for space scanning, the pulse efficiency of of the lasers can be increased.

Moreover, measuring both distance and altitude can be effected simultaneously through one arrangement and, at the same time, through a cyclical scanning operation, a total pulse sequence can be obtained which surpasses the pulse sequence afforded by an individual laser.

In addition, some of the techniques described may be used in the design of a communications transmission system using opto-electronic techniques. Furthermore, by modifying the above described antenna system, a high accuracy, low cost surveillance radar system can be constructed.

BRIEF DESCRIPTION OF THE DRAWINGS

FIGS. 8 and 9 depict the front and side views of the antenna planes of an antenna system according to the present invention having an n=4 and n=8 respectively.

FIG. 10 illustrates, by means of a block diagram representation, an embodiment of the present invention.

FIG. 11 depicts a modification of the system of FIG. 10.

FIGS. 22 and 23 depict the vertical and horizontal radiation patterns, respectively, of the spinner antenna of FIGS. 20 and 21.

FIG. 24 depicts the diverging reflective pattern of the antenna of FIGS. 20 and 21.

FIG. 25 illustrates a light distributor according to the present invention.

FIGS. 28A through 28F are presented to illustrate the derivation of the equations used in determining the bubble lens parameters.

DESCRIPTION OF THE PREFERRED EMBODIMENTS

Figure 1:
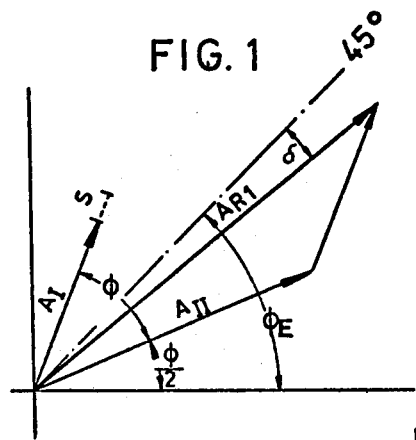
FIGS. 1-7 are vector diagrams used in illustrating the operation of a device according to the present invention.

For clarity, the following is a list of symbols used in the description.

$\phi^2$ Solid angle-partial segment (square angle)
I Solid angle plane between 90° and 45° Elevation (n=8)
II Solid angle plane between 45° and 0° Elevation (n=8)
−II Solid angle plane between 0° and −45° Elevation (n=8)
a Solid angle plane between 90° and 60° Elevation (n=12)
b Solid angle plane between 60° and 30° Elevation (n=12)
c Solid angle plane between 30° and 0° Elevation (n=12)
$\delta$ error angle of elevation (derivation of the set point $\phi_E$)
$n = 360°/\phi$
$D_L$ the diameter of a beam at the limit of which the transmissive intensity of the spherical surface reaches the value zero
OSA optical transmitting antenna
OEA optical receiving antenna
A.St. addition stage (summing circuit)
IV distributing amplifier
VZL delay line (delay network)
$n_1,2$ not identical with n
S.V. summing amplifier
PhS phase shifter
OD optical detector
HF high frequency
OF optical filter
$AR_1,2$ summing amplitude (resultant)

For discussion purposes, optical frequencies are defined to have a wavelength between 20 nm (1 nm = $10^{-9}$ m) and 20 nm (1 nm = $10^{-9}$ m), while microwave frequencies are defined to have a wavelength between 1 mm and 60 cm.

CIRCUIT FOR COMMUNICATIONS SYSTEM (TRANSMISSION LINK SYSTEM)

In accordance with my copending application Ser. No. 651,809, there is disclosed an evaluation circuit for an antenna system in FIG. 4 thereof which requires high positional stability of the antenna system. However, in accordance with the present invention as illustrated in FIG. 8 of this application, the antenna assembly of my copending application is improved by providing at least two upper and two lower antenna planes. In accordance with the system of the present invention, the summing amplitude and phase will remain constant even in the event of antenna fluctuation. Further, the mathematical basis of the evaluation procedure will be subsequently set forth, using the vector representations illustrated in FIGS. 1-7.

If, for example, the antenna system is provided with a hemispherical form and is divided into eight segments, i.e. n=8 (see FIG. 9) there results optical axes for the OSA and OEA extending around the angle $\frac{1}{2}$ (+45°)=45° and which may be out of phase to one another without amplitude or phase variation occurring. This characteristic constitutes a decisive advantage in an antenna system utilizing pulse amplitude modulation (PAM) or intensity modulation (IM).

A research report with the title "CO$_2$ Laser Communication Through an Urban Atmosphere", Siemens Research and Development Report, Vol. 2, 1973, No. 2, published by Springer Verlag New York and Heidelberg, shows the technical position. The block circuits contained in the report have been supplemented in accordance with the systems of the present invention as for example illustrated in FIG. 10 and FIG. 11.

In accordance with the present invention the antenna system utilizes optical antennas as disclosed in my copending application rather than Cassegrainian telescopes of the above-noted report as well as an evaluation as will be discussed below.

Figure 14:
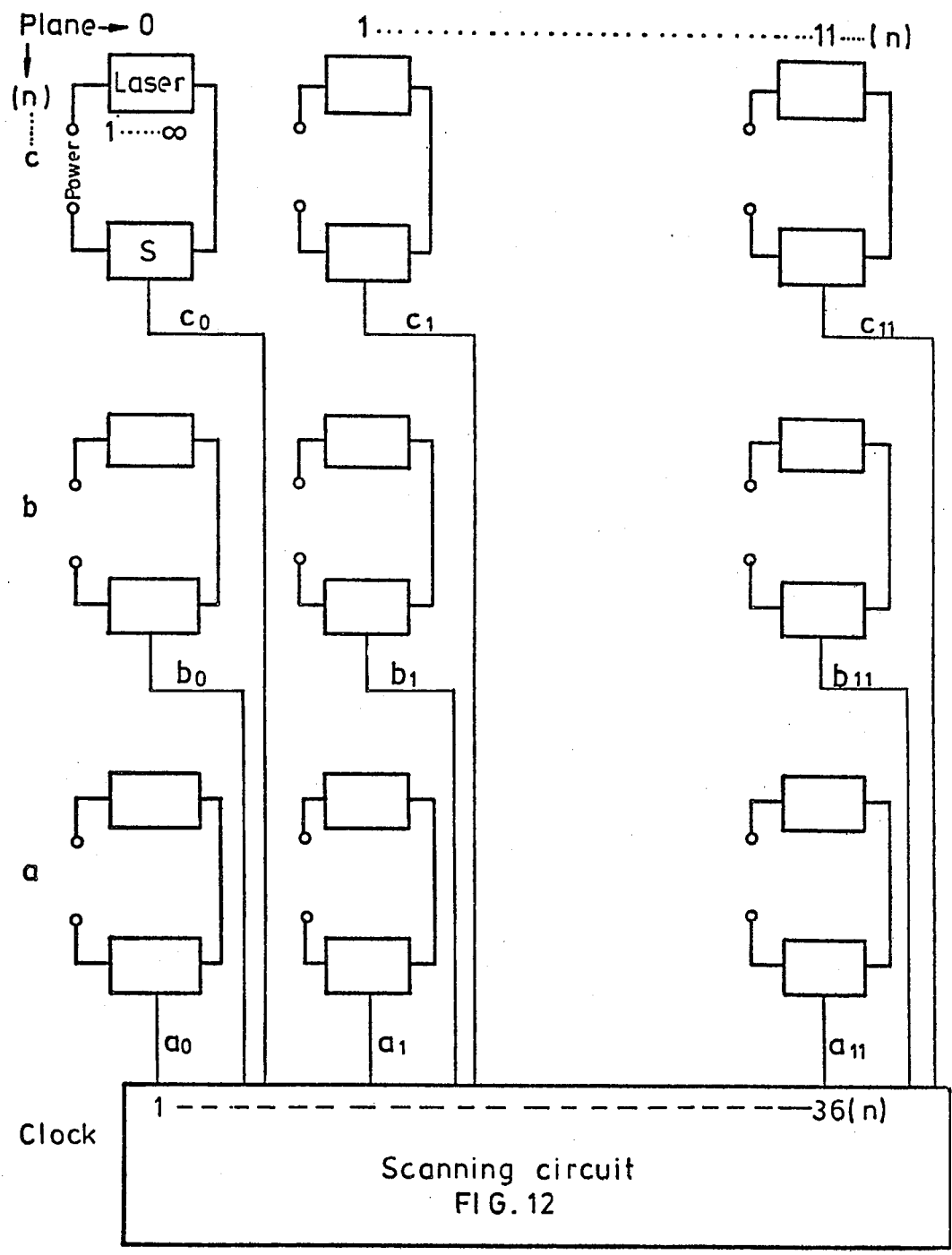
FIG. 14 depicts the configuration of the high speed circuit breakers S with respect to the lasers used in an embodiment of the present invention.

The planes of antennas in radial configuration, e.g. I and II for n=8, are connected by light conductors with $n_2$ diodes and form $n_2$ channels. A bandpass filter is subsequently necessary for each channel. An optical antenna system with n=8 pursuant to FIG. 9 requires 2·8=16 channels, and with n=4 pursuant to FIG. 8, only 4 channels. The outputs of the bandpass filters are connected to the associated addition stages A.St. of the individual antenna planes. The details of this addition stage are described in U.S. Pat. No. 3,953,131 FIG. 14 with the comparators of such patent being replaced by summing amplifiers. The outputs of the addition stages are connected to the inputs of the distributing amplifiers IV. These distributing amplifiers are necessary for a matched junction of the resulting voltages or currents, which are formed from the vectors of the planes.

For a configuration example pursuant to FIG. 9 with $n=8$, the vectors of the eight parts or segments of antennas of plane I or II form the inputs of the addition stage (same phase) and are branched from the respective distributing amplifier. Thereby only one output of each distributing amplifier is fed to the summing amplifier SV1 or SV2. The necessary phase displacement takes place in one branch by means of a delay network VZL.

Although the circuit in accordance with the system of the present invention may appear to be complex in comparison to prior systems, the present invention provides greater practical utilization. For example, a so-called "mono-antenna" or Cassegrainian telescope is mounted on the roof of a huge and rigid structure, the necessary positional stability for such system may be achieved. However, the present system does not require such positional stability such that the present invention is utilizable on mobile systems and masts or towers. In addition, the sub-reflector of a Cassegrainian telescope brings some disadvantages, the greatest being so-called shading. However, in an antenna system as disclosed herein utilizing a lens antenna in accordance with my copending application (FIGS. 10a, b and c) or in my U.S. Pat. No. 3,953,131 (FIG. 3a or FIG. 3b) these disadvantages are avoided.

Figure 2:
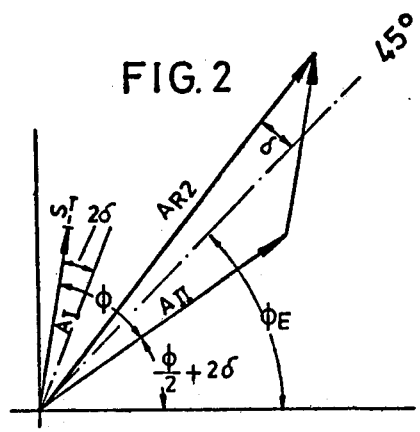
Figure 3:
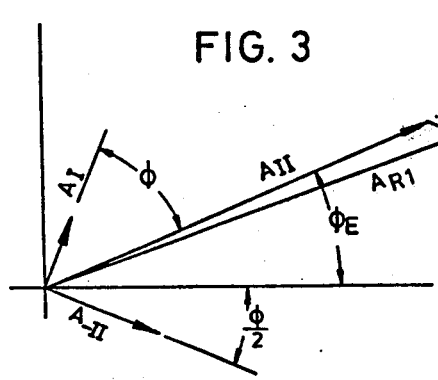

CIRCUIT FOR PROCEDURE 1 AND EXPLANATION WITH THE AID OF AN EXAMPLE WITH n=8 FOR THE DETERMINATION OF $\phi_E$ FIG. 1 and 2 of the present application show that alternatively a turn of the vectors $A_{II}$ and $A_I$ around the value $\delta_2$ has a similar effect to the phase interchange disclosed in my copending application. In FIG. 3 of this application, the vectors are portrayed with unvarying phase position. $A_{R1}$ is formed from these vectors.

Figure 4:
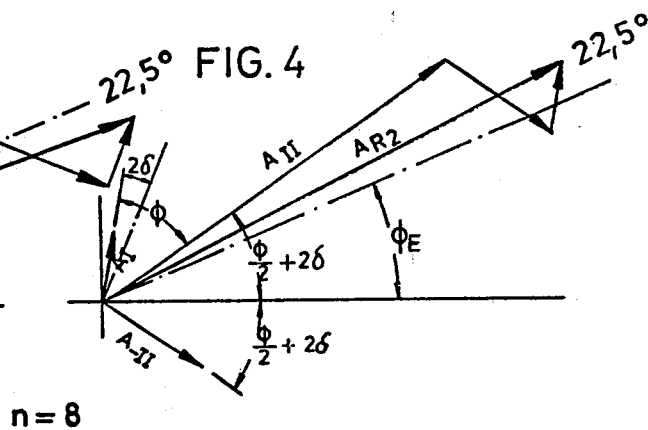
Figure 5:
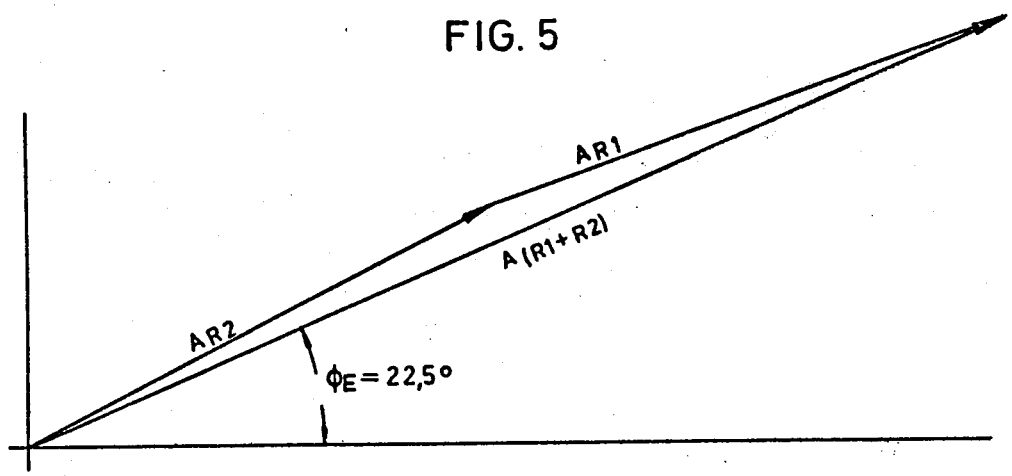

In FIG. 4, these vectors are phase-displaced around the value $2\delta$ degrees. $A_{R2}$ is formed from these vectors.

The angle $\phi$ between $A_{II}$ and $A_{-II}$ is simultaneously increased to the value $2(\phi/2+2\delta)$ degrees. The vector diagram FIG. 5 (for a chosen example) in the present application shows the direction $\phi E = 22.5°$.

The diagrams show that by appropriate adjustment of the vertical phase shifter and amplification, the determination of $\phi_E$ is possible with considerable accuracy already with $n=8$.

Figure 6:
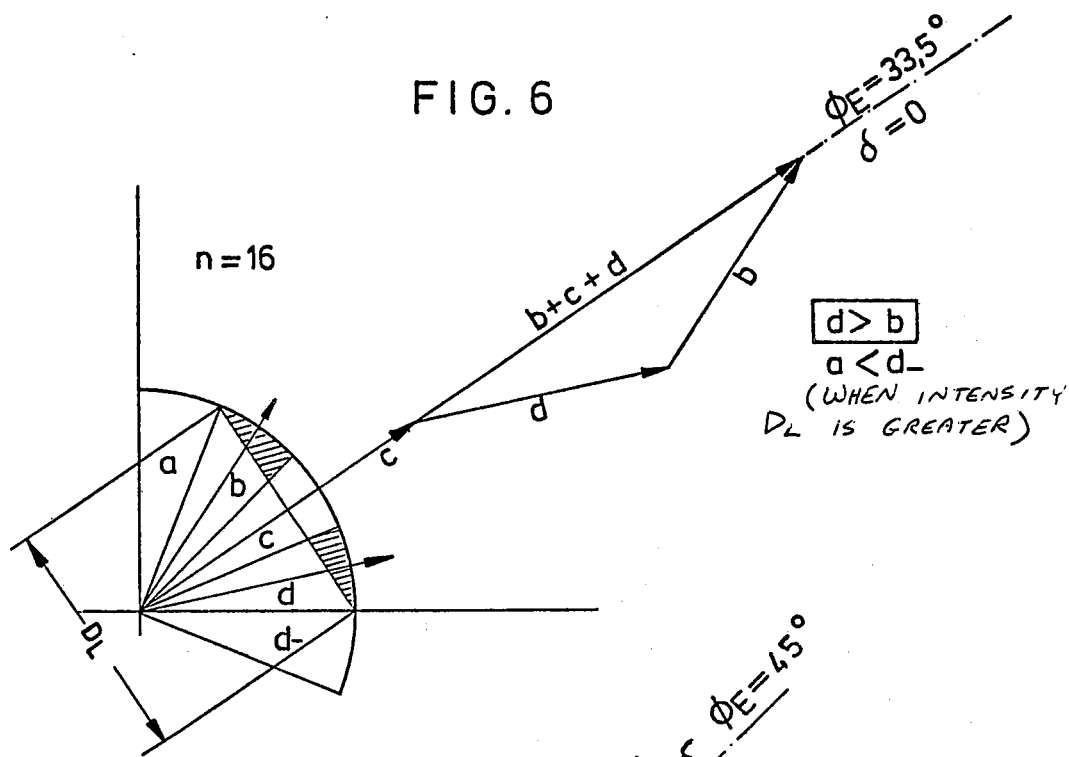

FIG. 6 of the present application is a diagram for a system which $n=16$. Where $n=16$ a correction circuit pursuant to FIG. 4 of my copending application is no longer required. Since with $n=16$ absolute accuracy is enabled.

Figure 7:
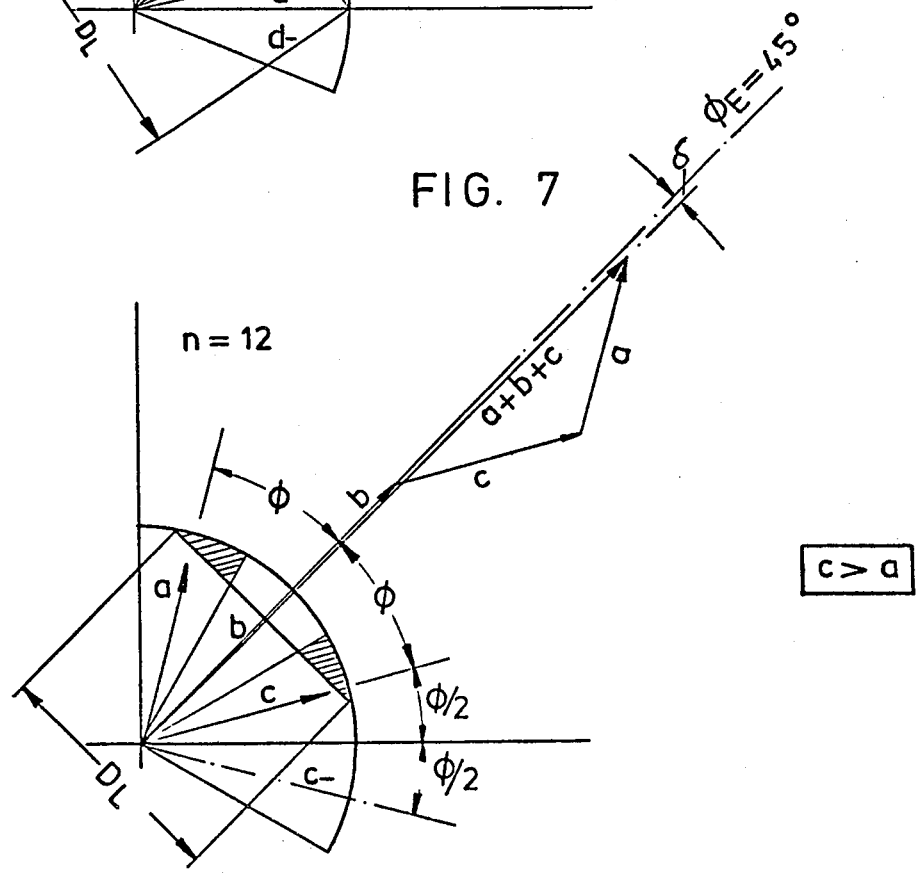
Figure 16:
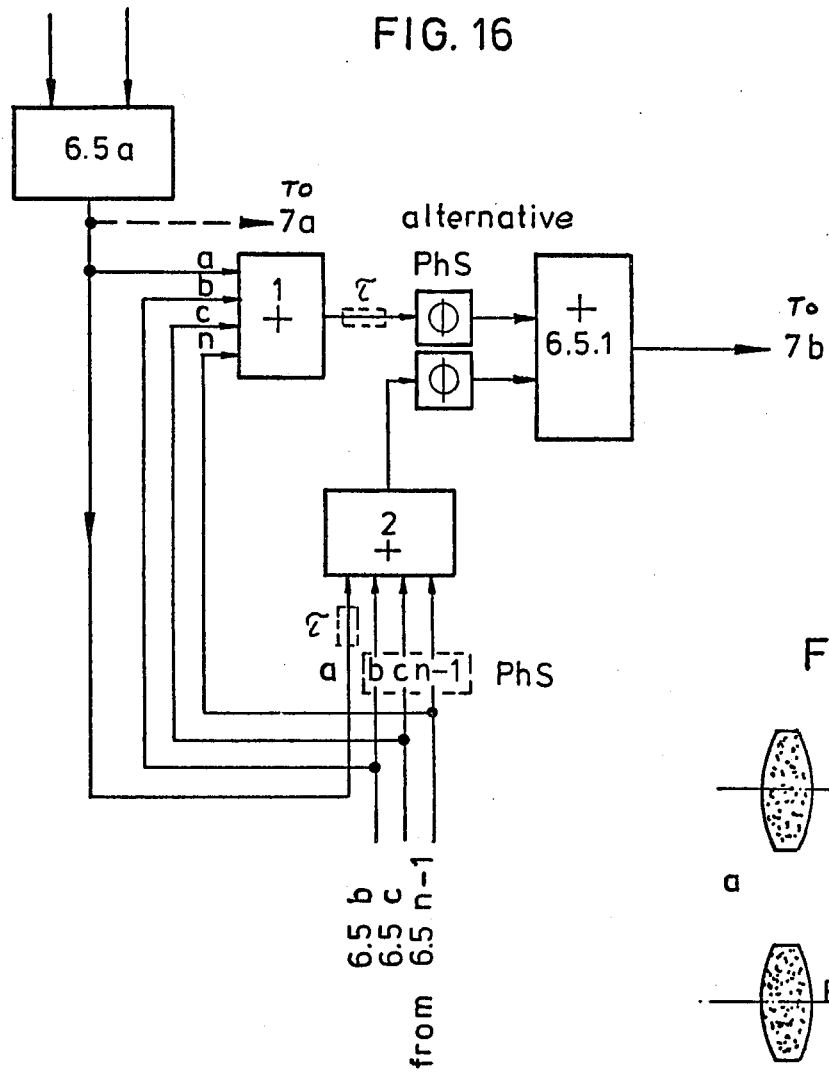
FIG. 16 depicts, in block diagram form, a partial view of an alternative evaluation method according to the present invention, applicable to n planes.

FIG. 7 illustrates a diagram for a system with $n=12$. The error angle of elevation is small and is balanced by the circuit described in accordance with the present invention as illustrated in FIG. 16 wherein the inputs of summing stages 1 and 2 correspond to the number of selected vertical planes, reduced by one.

OPTICAL ANTENNA STRUCTURE

The hexagonal form shown in copending U.S. application Ser. No. 651,809 FIG. 10b and 10c replaces the circular aperture form used in prior art systems. Understandably, this hexagonal form—equilateral or non-equilateral—can be constructed of homogenous matter, e.g. glass or synthetic material.

Figure 17:
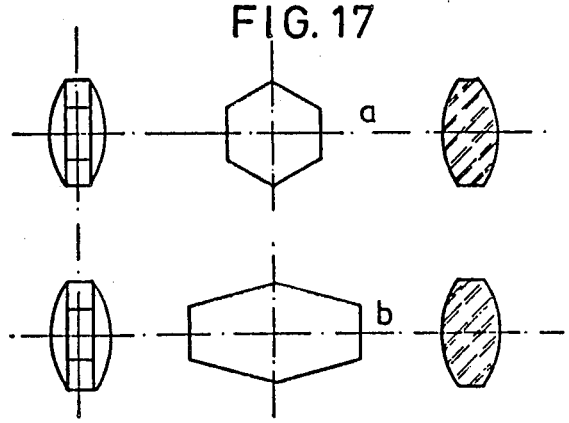
FIG. 17 depicts hexagonal antenna lens elements used in the present invention.
Figure 18:
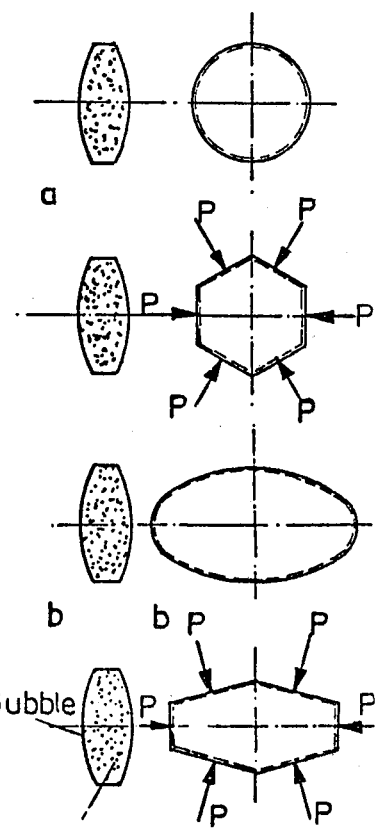
FIG. 18 depicts diaphanous bubbles which assume hexagonal shapes through the pressure of neighboring bubbles.

FIG. 17a and b show these hexagonal apertures. In FIG. 18a and b, a diaphanous bubble with refractive filling is illustrated which assumes the shape equilateral (in a) or non equilateral (in b) through the pressure of neighboring bubbles.

The following is a derivation of some of the lens parameters associated with diaphanous bubble lens elements. FIGS. 28A–28F are provided to illustrate these parameters as well as the bubble structure.

Figure 28A:
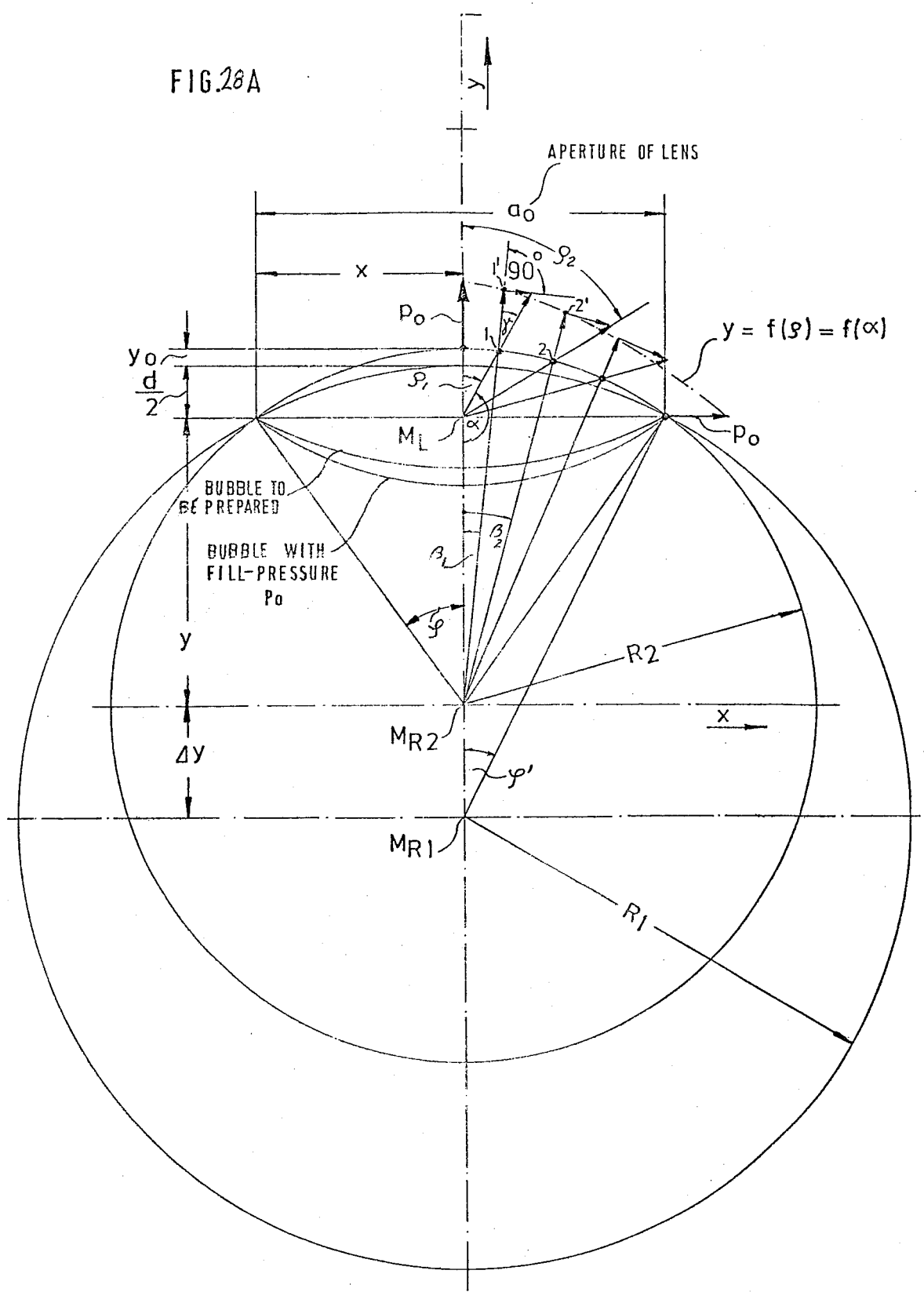
Figure 28E:
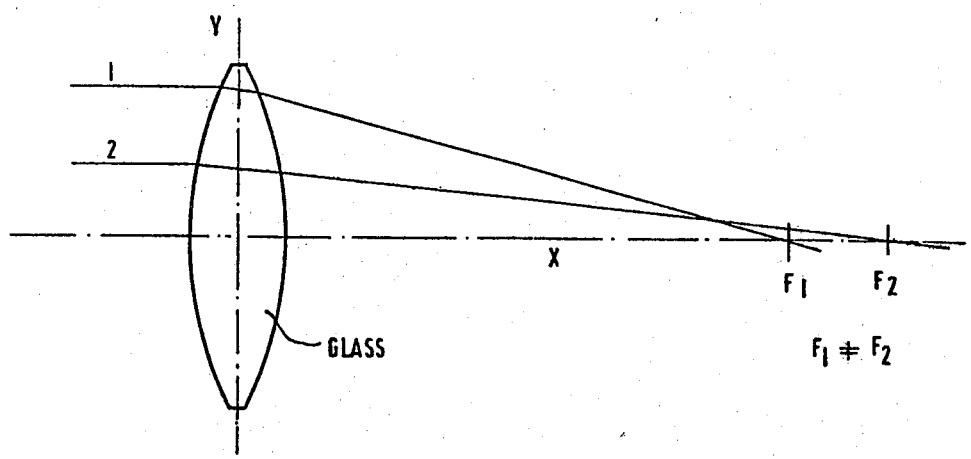
Figure 28F:
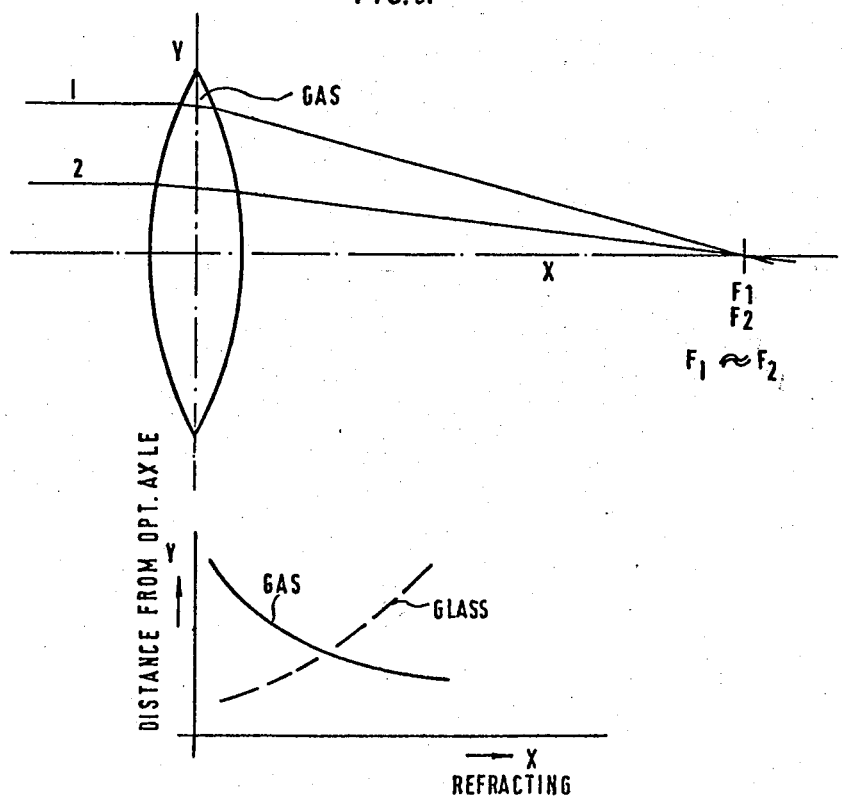

DETERMINATION OF $\Delta y$ AND $R_1$ (see FIG. 28A)

$$\cos \zeta' = \frac{y + \Delta y}{R_1} \qquad R_1 = y + \Delta y + \frac{d}{2}$$

Furthermore $x_1 = x_2$

I. $x_1^2 + y^2 - R_2^2 = 0$

II. $x_1^2 + (y + \Delta y)^2 - R_1^2 = 0$

IIIa. $x_1^2 + (\Delta y + y)^2 - y^2 + \Delta y^2 + \left(\frac{d}{2}\right)^2 = 0$ also, $x_1^2 + y^2 + 2\Delta y^2 - y^2 + \frac{d^2}{4} = 0$ $x_1^2 + 2\Delta y^2 + \frac{d^2}{4} = 0 \qquad -\Delta y = \pm \frac{1}{2}\sqrt{x^2 + \frac{d^2}{4}}$ $-2\Delta y = \pm \sqrt{x^2 + \frac{d^2}{4}} \qquad R_1 = \sqrt{x^2 + (y + \Delta y)^2}$

INTERNAL PRESSURE OF LENS (SEE FIG. 28B AND FIG. 28C)

$$C = R_2 - \left(\frac{d}{2} + y_0\right)$$

$R_2 = a$ $b = \overline{M_L, 1} = \dfrac{\frac{d}{2} + y_0}{\cos \rho}$ $c = \dfrac{a \cdot \sin\gamma}{\sin\alpha} \quad \sin \gamma = \dfrac{C}{a} \cdot \sin\alpha$ $\sin = \dfrac{R_2 - \left(\frac{d}{2} + y_0\right)}{R_2} \cdot \sin\alpha$ $\dfrac{R_2 - \frac{d}{2} + y_0}{R_2} = k$ $\sin\gamma = k \cdot \sin\alpha$ for $\rho = 0$ it is $\alpha = 180°$, and the $\sin 180° = 0$ also, $\sin\gamma = k \cdot \sin 180° = 0$ $\sin\gamma = f(\sin\alpha)$ $\dfrac{P_0'(L)}{P_0(L)} = \cos\gamma$ $P_0'(L) = \cos\gamma \cdot P_{0(L)}$ $\cos\gamma = \sqrt{1 - \sin^2\gamma}$ $\cos\gamma = \sqrt{1 - k^2 \cdot \sin^2\alpha}$ $P_0'(L) = \sqrt{1 - k^2 \cdot \sin^2\alpha} \cdot P_{0(L)}$

SCANNING

Figure 12:
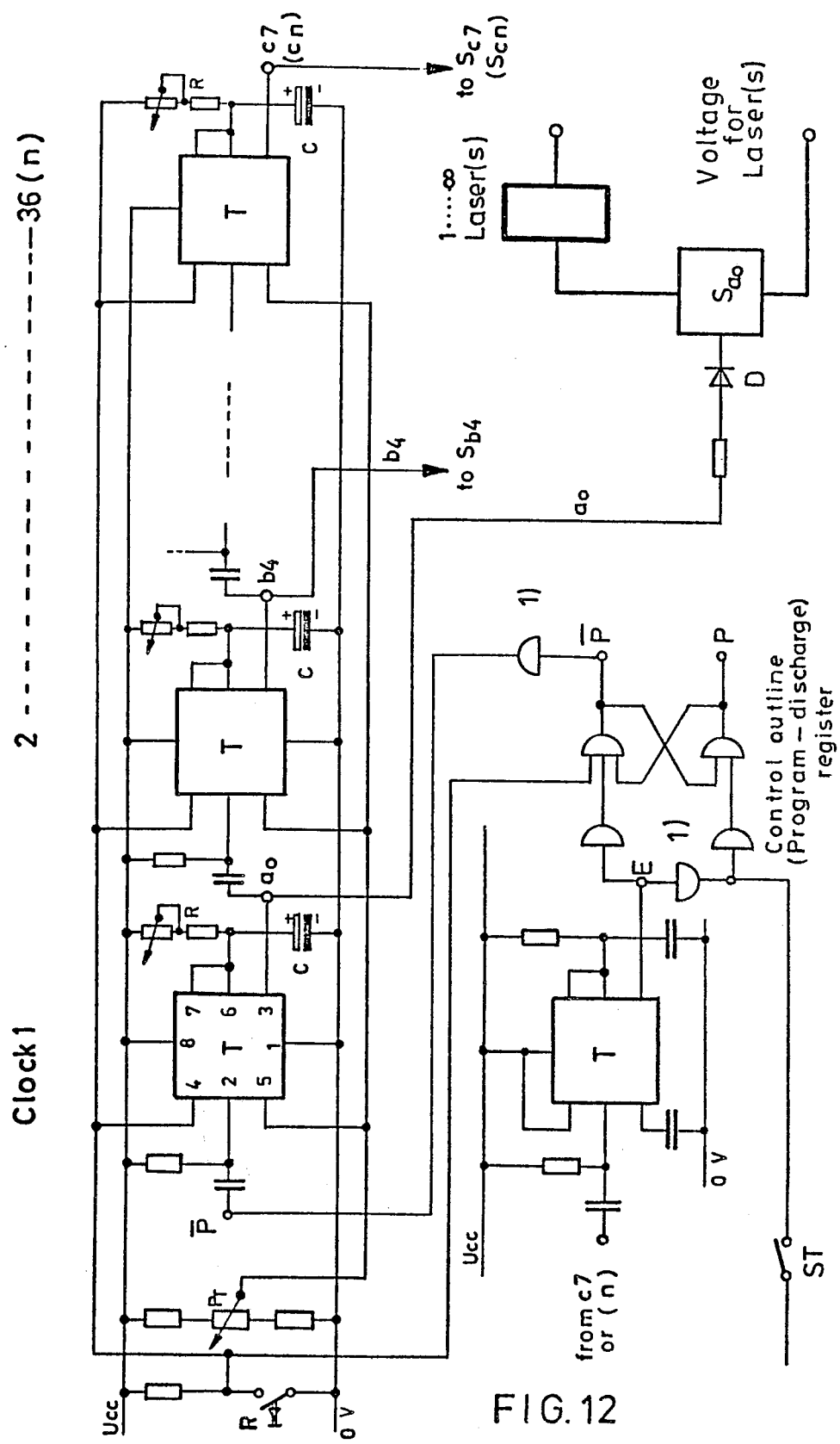
FIG. 12 shows a circuit diagram of a portion of an embodiment of the present invention.

The basic diagram for a system in accordance with the present invention with n=12 is shown in FIG. 12: A plurality of timers are connected in series so that their outputs as illustrated in the scanning diagram of FIG. 13 trigger the associated high speed circuit-breakers S. These circuit-breakers close or open the circuit for one or more lasers per solid angle plane of $\phi^2$ (see FIG. 14).

Figure 15:
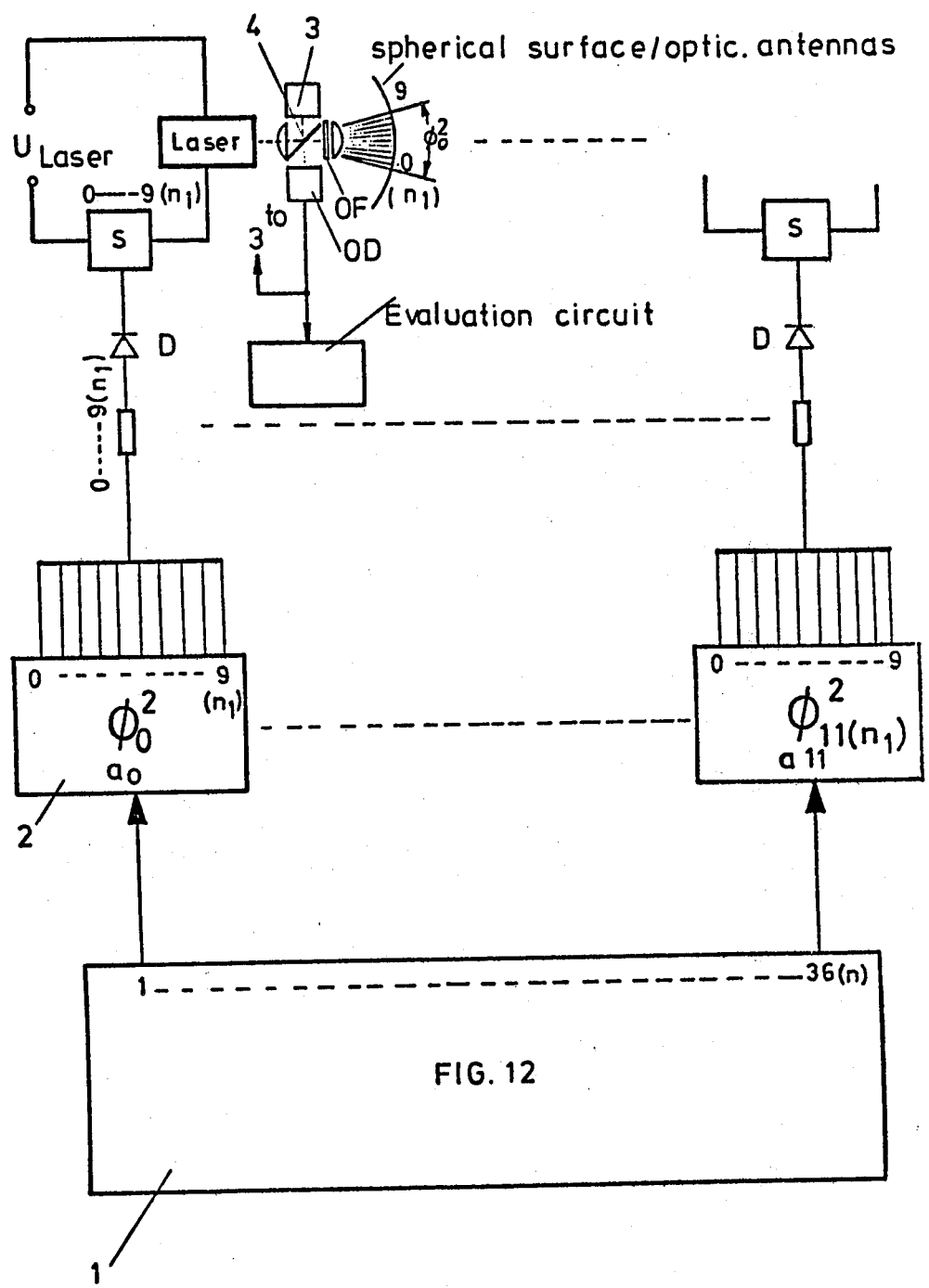
FIG. 15 illustrates another embodiment of the present invention.

For finer scanning subdivision, the timer circuit is expanded as illustrated in FIG. 12, so that, pursuant to FIG. 15, each solid angle plane of $\phi^2$ planned for radiation can be subdivided as required. In FIG. 15, each solid angle plane $\phi^2$ is provided with its own scanning circuit (computer controlled) added to the basic circuit diagram (FIG. 12). This scanning circuit (computer controlled) is constructed in the same manner as FIG. 12 and has for example 0...9 or ($n_1$) outputs, see FIG. 15 (Block 2). The pulse duration of a timer in Block 2 is thus 10 times larger or $n_1$ times larger than the pulse duration of a timer in Block 1. The pulse duration can be adjusted by the potentiometer R (in FIG. 12).

The following is a listing of devices which may be used for the Timer T:

| Manufacturer | Part Number |
|---|---|
| Signetics | NE 555 |
| Motorola | MC 1555 |
| Silicon General | SG 555 |
| Intersil | NE 555 |

The basic circuit diagram of a timer with a monostable circuit is shown in the journal "Der Elektroniker" CH-5001 Aarau (Switzerland) in No. 6, June 1974, page EL 34. The pulse duration for the timer is determined by $t = 1.1 \cdot R_A \cdot C$.

Figure 13:
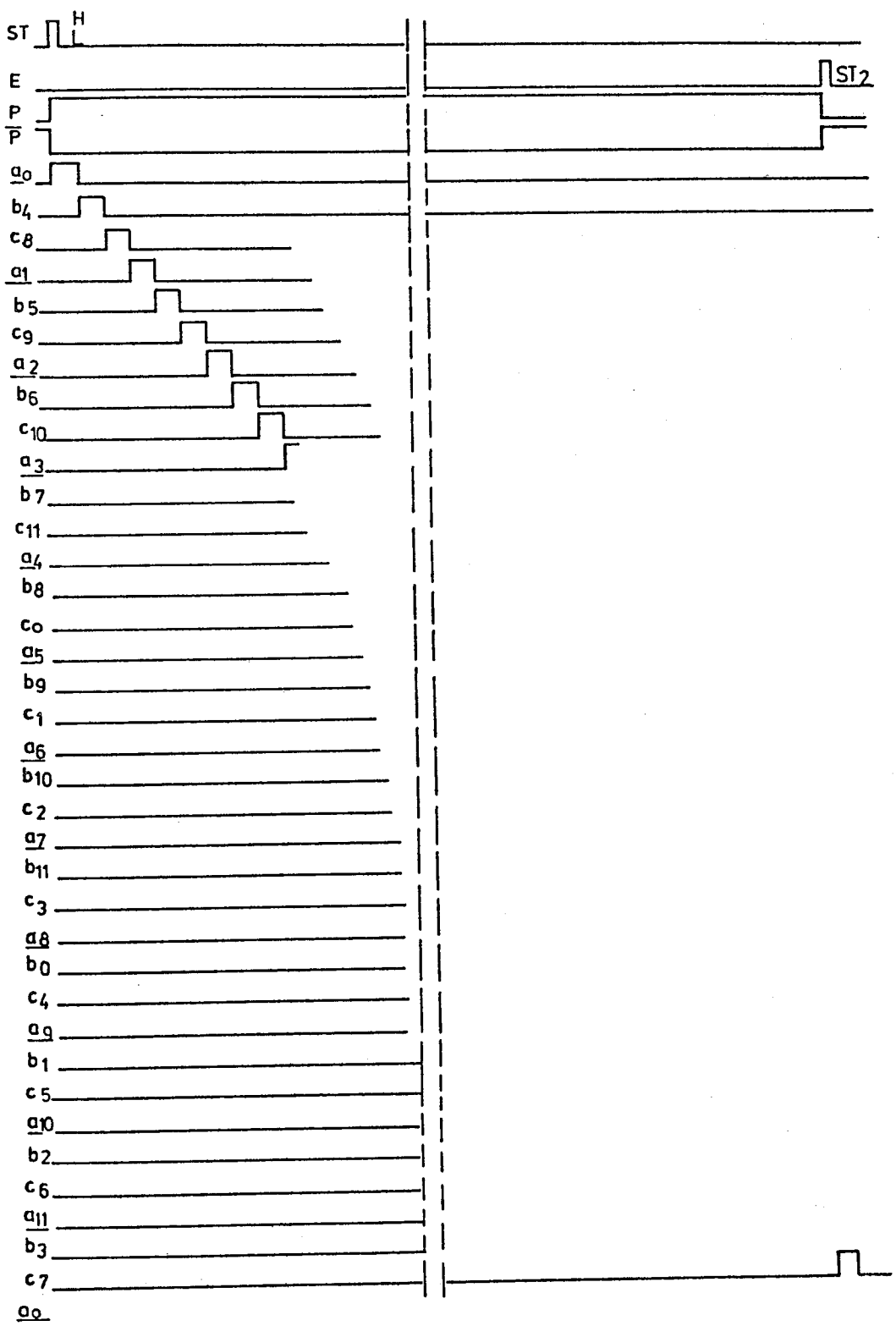
FIG. 13 illustrates the waveforms associated with the circuit of FIG. 12.

In the pulse diagram, FIG. 13, ST marks the start pulse. This pulse sets the register of the scanning program (see FIG. 12). The output P loads with the steep slope the 1st condenser of the 1st timer, which again loads in the same way 2nd condenser C of the 2nd timer, etc. The whole pulse duration or, respectively, the pulse duration of each individual pulse can be altered by the potentiometer $P_T$.

The switch R is to interrupt and reset the program. The outputs P (program operation) and E (program END) can be used for further controls. By output P, the scanning circuit (computer operation) is automatically repeated, when the output is connected to input P of the 1st timer (on this point, see journal "Der Elektroniker" No. 4, 1975).

The switch S can be represented by:
1. Relays
2. Semi-conductor power switches (e.g. 80-A thyristor for 10 kHz manufactured by International Rectifier).

When selecting a suitable switch S, the following fundamentals must be borne in mind:
1. Power and pulse duration of laser
2. Switching time delay and pulse rise time
3. Slant range to present position with radar The diode located before switch S in FIG. 15 can, for instance, be replaced by a unijunction transistor (UJT); for more exact controls, a programmable four-terminal diode should be selected, the so-called programmable UJT, as the trigger element for thyristors.

EXAMPLE DETERMINING THE REQUIRED CHARACTERISTICS FOR SWITCH S (a) Slant range to present position D=150 km. For forward and return: 2D $$\text{Time delay } T_L = \frac{2 \cdot D \text{ (km)}}{c} = \frac{2 \cdot 150 \text{ km}}{300\,000 \text{ km/s}} = 1\text{ms}$$

Accurate value of c: 299 793 km/s
Thyristor 80-A: pulse repetition frequency 10 kHz $$\text{repetition rate } T' = \frac{1}{f}$$

$$T' = \frac{1}{10 \cdot 10^3} = 0.1 \text{ ms}$$

$$T' < T \, 0.1 \text{ ms} < 1\text{ms}$$

The above-mentioned thyristor is thus suitable for the slant range to present position $D \geq 15$ km.

(b) Slant range to present position D=150 m $$T_L = \frac{2 \cdot 150 \cdot 10^{-3}}{300\,000} = 10^{-6} \text{s} = 0.001 \text{ ms}$$

$T_L < T'$; 0.001 ms < 0.1 ms

In case (b), the pulse repetition frequency must be reduced accordingly; at the same time, the pulse duration of the laser is required to be smaller than 1 μs.

Speed switches for laser power can also be represented by the PIN diode. The PIN diode is already used in secondary radar technology (see book "Sekundär-Radar" by Peter Honold, c/o Siemens).

For the PIN diode, a separate oscillator is necessary for the frequencies between approximately 10 mHz and 1100 mHz.

In addition, FIG. 15 contains the diode(s) or detector 3 for measurement of distance. The share of the transmitting pulse required for the same is taken from the beam splitter 4. A suitable range indicator is supplied, for example, by United States Corp., USA, for the shortest times of −0.1 picosecs.

Thus, a new radar system according to the present invention is superior to prior art radar systems in both accuracy and scanning velocity and operates without the use of a rotatable antenna.

FORM OF THE MATHEMATICAL HYPOTHESIS USED IN FIG. 19

The general form of the hypothesis as per U.S. application Ser. No. 651,809 is as follows noting that it actually applies to the deviation of $-\Delta \phi$. For the derivation principle, however, this is immaterial.

$$\cos 2\Delta\phi = \frac{(Ac - Ac')\cos \Delta\phi}{(A - c + A'-c)\dfrac{1}{\cos \Delta\phi}} = \frac{1 - Ac'}{1 + A'-c} \cdot \frac{\cos \Delta\phi}{\dfrac{1}{\cos \Delta\phi}}$$

Figure 19:
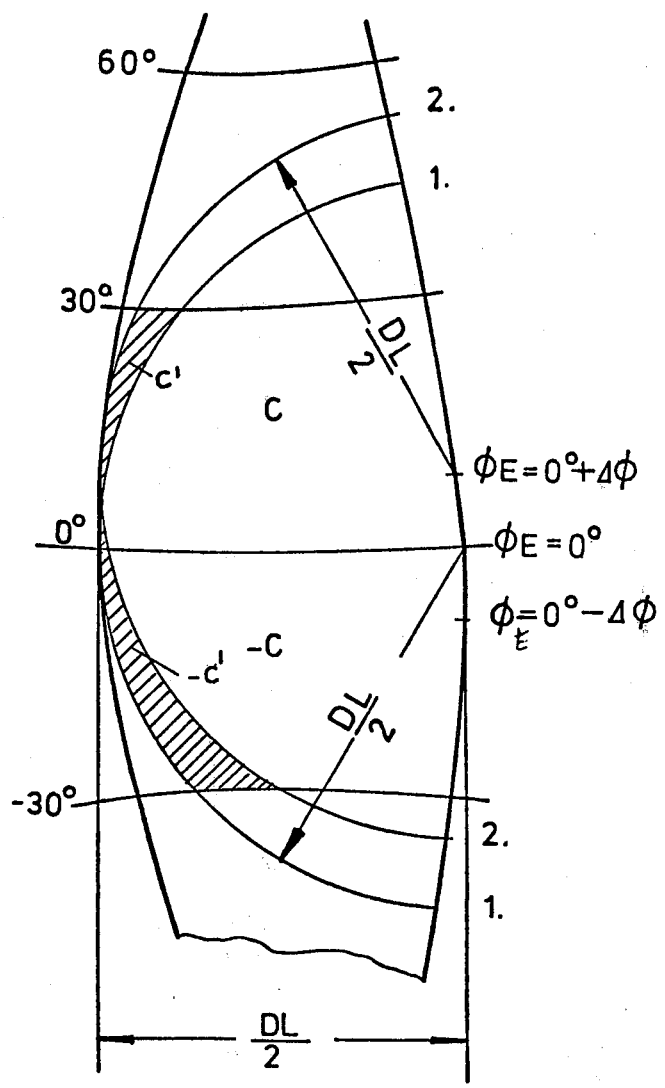
FIG. 19 illustrates a portion of a spherical surface segment.

The quotient $$\frac{1 - A'_c}{1 + A'_{-c}}$$

is the relationship of reduction and increase of the spherical surface segments c or respectively $-C$ at $\Delta \phi$ to the same sized surface segments at $\phi_E=0°$. This increase, or respectively, reduction is cross-hatched in FIG. 19.

The quotient $$\frac{\cos \Delta \phi}{\frac{1}{\cos \Delta \phi}}$$

is the relationship of the differences in intensity of the irradiated spherical surface components on deviation by $\Delta\phi$ from the zero line ($\phi_E+\Delta\phi$) and corresponds analogously to the relationship of the amplitudes $A_c$ or, respectively, $A_{-c}$.

On deviation of the optical axis from the zero line, both quotients can only follow the same spherical association characteristics, so that $$\frac{1-A_c'}{1+A'_{-c}} = \frac{\cos \Delta\phi}{\frac{1}{\cos \Delta\phi}}$$

can be set.

From this results:

$$\left(\frac{\cos \Delta\phi}{\frac{1}{\cos \Delta\phi}}\right)^2 = (\cos^2 \Delta\phi)^2 = \cos^4 \Delta\phi$$

This equation provides serviceable results for the range of application described in the present invention for divided and irradiated spherical surfaces, if an empirical examination confirms its accuracy. For example:

$$\Delta\phi=15° \rightarrow \cos 15°=0.96589$$

$$\cos^4 \Delta\phi = (0.9659^2)^2 = 0.96589^4 = 0.866$$

$$\cos 2\Delta\phi=0.866$$

$$2\Delta\phi=30°$$

$$\Delta\phi=15°$$

SURVEILLANCE RADAR SYSTEM

The following is a discussion of a surveillance radar system according to the present invention.

Figure 20:
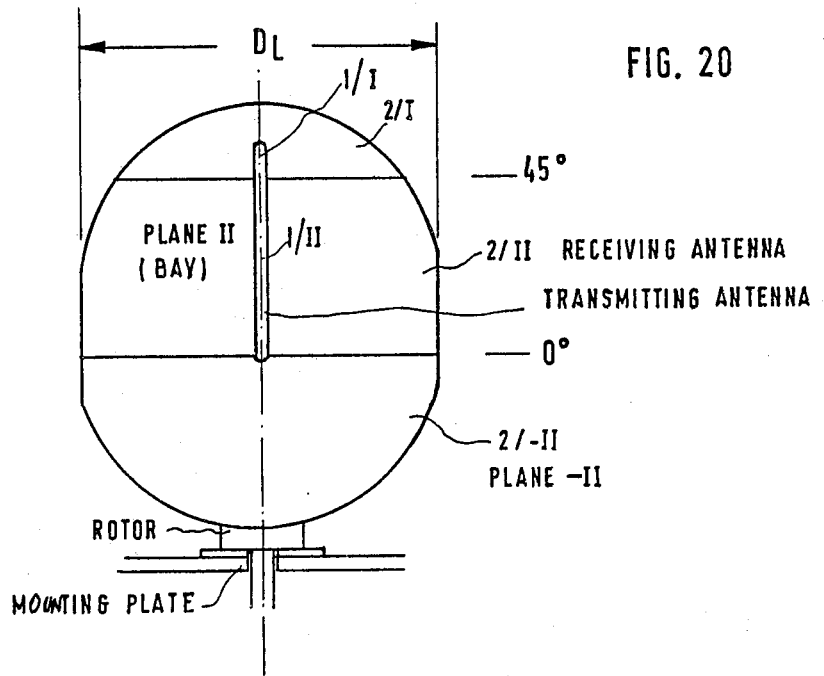
FIGS. 20 and 21 depict the front and side views, respectively, of a spinner antenna according to the present invention.
Figure 21:
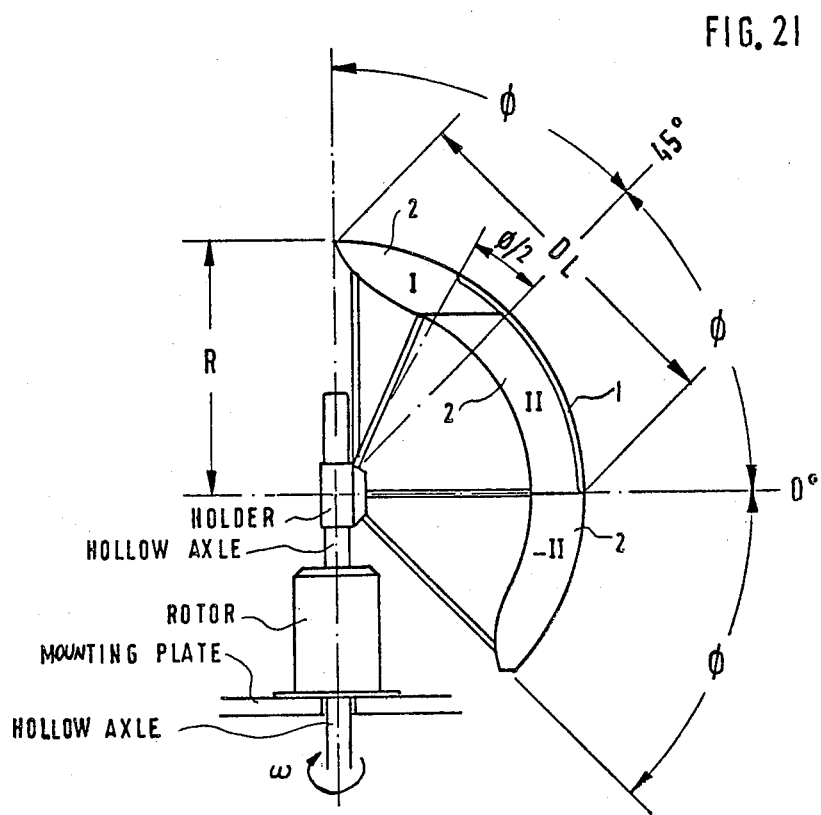

As an example with optical antennas, the structure and assembly of this spherical antenna surface is described below:

FIG. 20 shows the front view and FIG. 21 the side view of this spinner antenna; only a narrow section—of the width $D_L$—of the sphere already described is used. A protecting cover, not shown here, lends this antenna a smaller, constant wind resistance.

For the familiar example with $n=8$, vertical planes I, II and $-$II are required for evaluation in the elevation, if measurements are to be made within the limits $\phi_E=0°$ and $45°+(45°/2)=67.5°$.

(For values greater than $\phi=67.5°$, one must make $n>8$).

Plane$-$II is only required for evaluation of receiving radiation in the limits 15° to 0° in the elevation.

The evaluation in azimuth can be made with an antenna width of $D_L=\sqrt{2} \cdot R$, if the optical atennas have a wide field characteristic. In the case of simple optical antenna, there is no point in making this width any greater than $$D_L = \frac{1}{2} \cdot \sqrt{2} \cdot R.$$

In the rotation axis of $D_L$, the transmitting antennas (1) are arranged in a narrow spherically shaped strip, but they are also used as receiving antennas (see FIG. 20 and 21). In this example, the vertical arc length or, respectively, the vertical angular range lies within the limits 0° and 67.5°. FIG. 22 shows the pertinent vertical pattern. A very narrow horizontal pattern for the transmitting antennas is achieved with a line (1) of single antennas vertically in tandem.

FIG. 23 shows the pertinent horizontal pattern, and FIG. 24 represents the reflection diverging from target.

The receiving antennas (2) are arranged to the right and left of these antennas (1) (see FIG. 20 and FIG. 21).

It is simple to convert this into a monopulse antenna by separately evaluating the large receiving antenna effective area (2) on the left and right of this spherical strip (1). The neighboring antenna parts thus created are assigned to separate receivers and evaluated out of phase.

Figure 26:
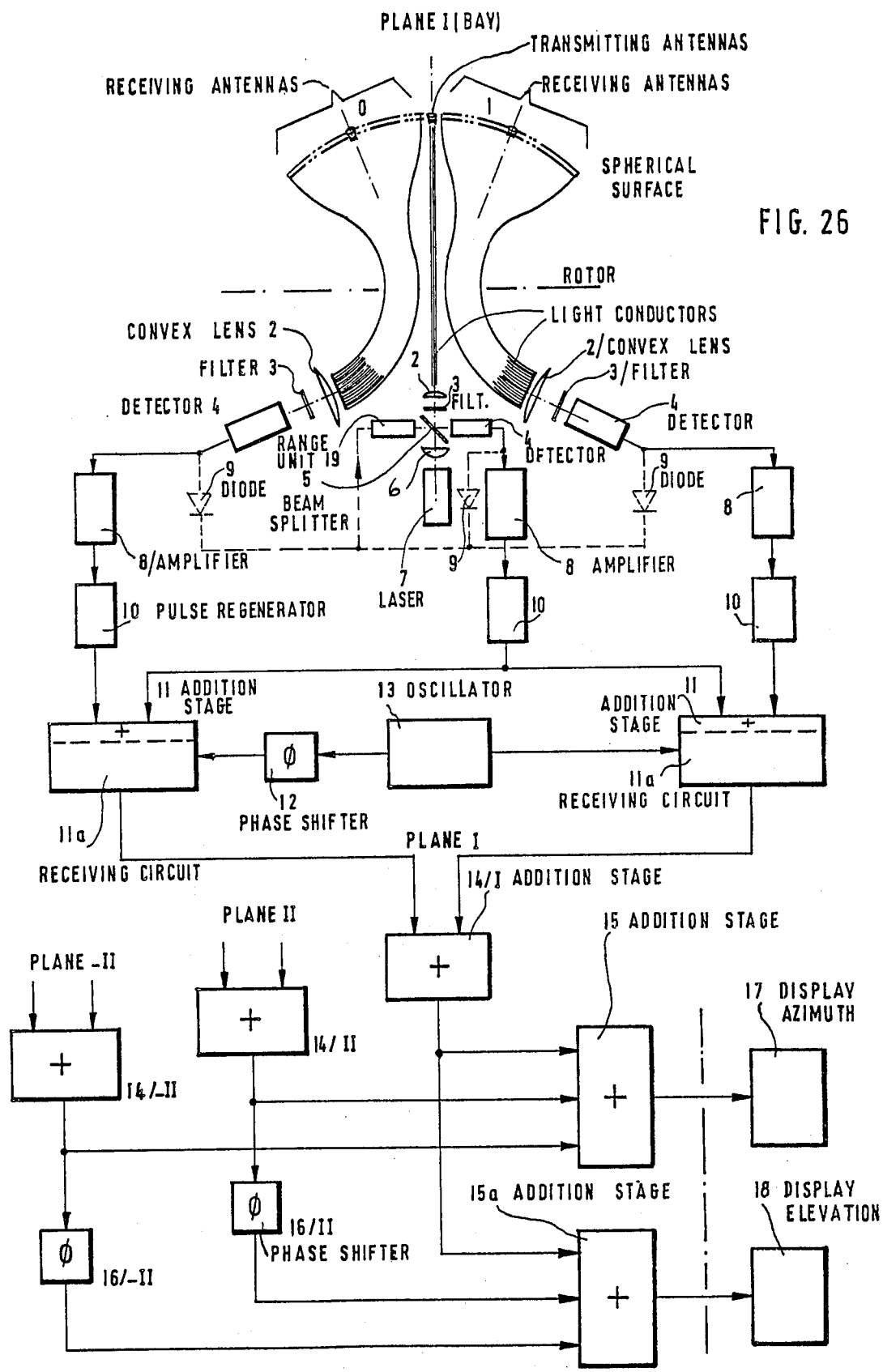
FIG. 26 depicts an entire system according to the present invention.
Figure 27A:
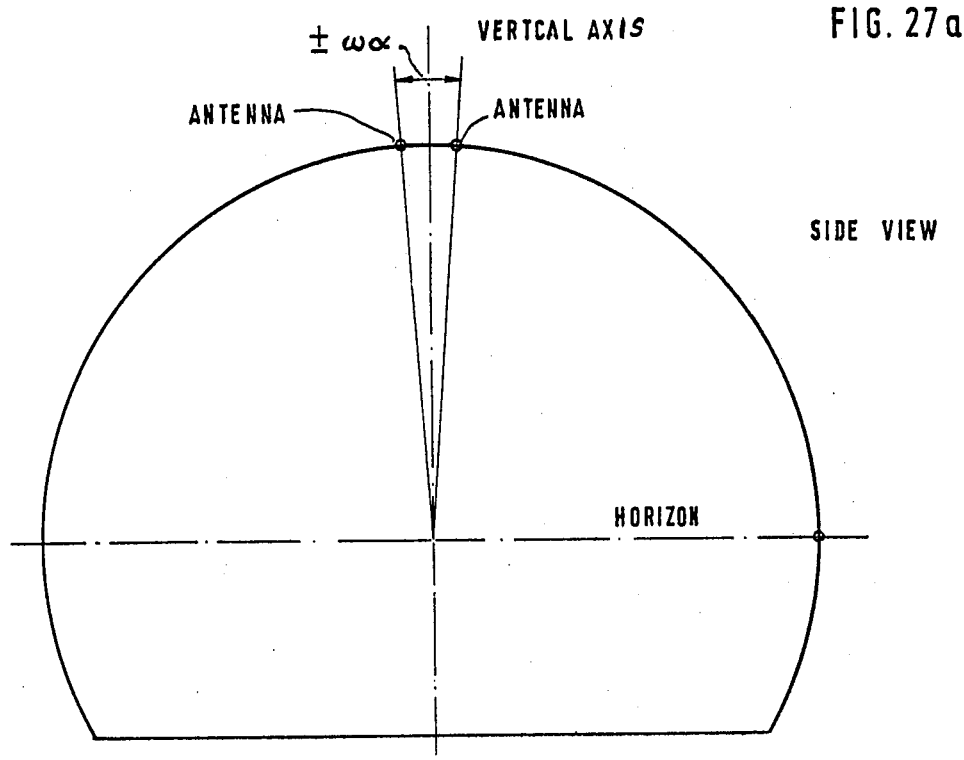
FIGS. 27a and b illustrate the relationship of the antenna elements with respect to the vertical and horizontal axes and the horizon.
Figure 27B:
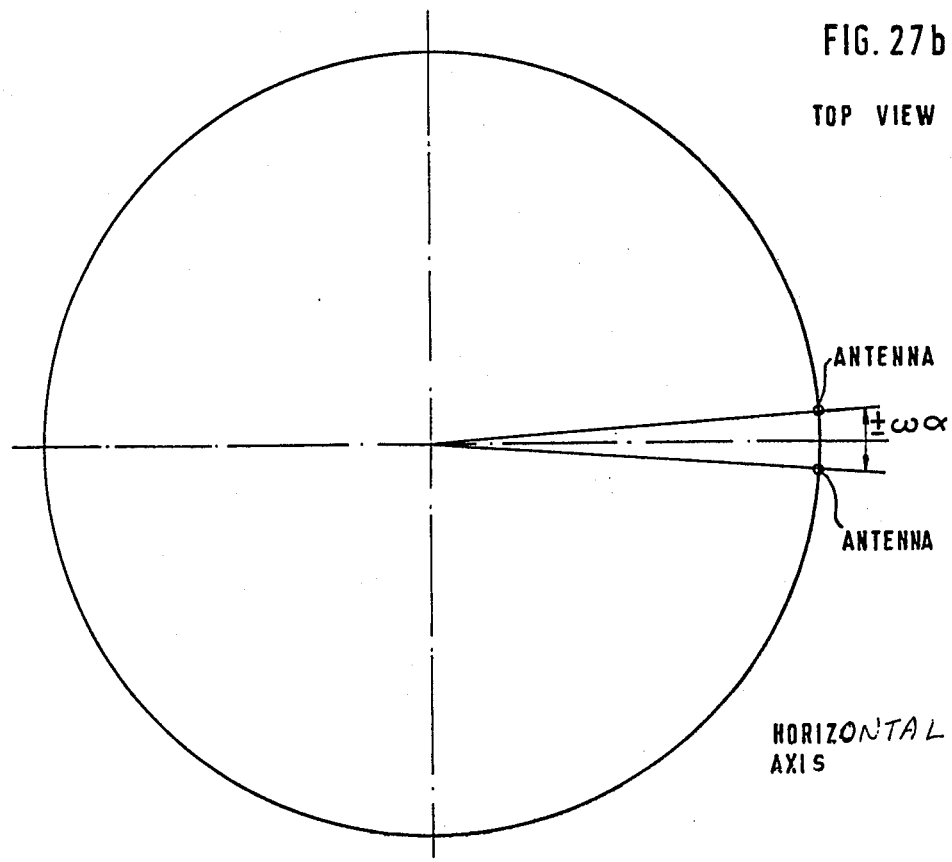

For the present example, electronic evaluation is described in FIG. 26; here the method of vector addition already described in U.S. Pat. No. 3,953,131 and copending U.S. application Ser. No. 651,809 was selected. Of course, the division method can also be used.

In FIG. 26, 0 and 1 designate the top view of the spherical surface, made up of receiving antennas, of a plane (e.g. I), which is divided in the middle by the spherical strip of transmitting antennas. The connection of all antennas to the pertinent detector (4) is made in the familiar manner via light conductor and convex lens (2). The filter (3) is situated between the detector (4) and the convex lens (2).

The convex lens (2) can be constructed in a conventional manner, but it is more practical to construct this convex lens as integrated optics as per FIG. 10b in the copending U.S. application Ser. No. 651,809, now U.S. Pat. No. 4,099,879 and on the principle of the antenna system. In this way, an ideal light conductor distributor is simultaneously produced, which is at present sought after for general cabling (see Entwicklungs-Bericht) Vol. 5 (1976) No. 1 Pages 47-53 "Verzweigungseinrichtung für Lichtwellenleiter" (Junction Device for Light Wave Conductors). This antenna (or lens) which I have already described, spherically composed of a large number of single lenses, thus constitutes (in miniature) an ideal light conductor distributor.

The signal outputs of the detectors (4) are connected to the precise range unit (19) via the diodes (9) and connected in parallel to the amplifier (8).

For the distribution of transmitting radiation, it is planned to use the integrated light conductor distributor (made up of a large number of hexagonal lenses), which can also be constructed pursuant to FIG. 25. The filter (3) is required for the receiving radiation in the range of the transmitting antennas. In front of the beam splitter (5), there is a lens (6) to straighten radiation from 1 or n laser (7).

The impulse shaper (10) has the task of regenerating the amplified (and deformed) receiving pulse.

All outputs from the pulse shaper (10) are added in the separate summing circuits (11). This sum signal is used as a trigger in the receiving circuits (11a), which are shown in detail in FIG. 15 of U.S. Pat. No. 3,953,131. This includes also the oscillator (13) and the phase shifter (12).

The outputs of the receiving circuits (11a) are added in the addition stages (14/I, II and −II) and supplied to addition stages (15) and (15a). Only the outputs to addition stages (14/II) and (14/−II) must—as already described—be conducted via the phase shifters (16/II) and (16/−II) for evaluation in the elevation. Display (17) shows the angle of azimuth and display (18) the angle of elevation $\phi_E$.

If a monopulse technique is not required in the horizontally neighboring planes, then these neighboring receiving antennas are not evaluated separately but are combined. Only one receiving circuit (11 and 11a) is necessary per horizontal plane (I, II or −II) and no phase shifter (12) is required in any of the planes (e.g. I, II and −II).

The advantage of the method described here is constituted by the possibility of exactly evaluating, from a large, complete vertical pattern, the receiving radiation (from the target) caused by reflection, for determination of $\phi_E$ (on this point, see FIG. 22 and FIG. 24).

This has not been possible in any prior art radar systems developed to date. In addition, a laser radar antenna has no so-called side lobe in the radiation pattern, which was unavoidable in all prior art h.f. antennas and could lead to location errors.

All parts required in already familiar h.f. radar systems, such as selsyn synchro control and selsyn receiver (see the book "Radar in der Flugsicherung" (Radar in Air-Traffic Control), Part IIIC by Professor Leo Brandt, block diagram on page 139) can be assumed to be known.

A further alternative is a "QUASI-STATIONARY SYSTEM". This means a system constructed as per FIG. 1 and FIG. 2 in U.S. Pat. No. 3,953,131 and which in the azimuth and elevation only makes short swinging movements in the angular range of neighboring antenna positions on the longitudinal and latitudinal lines. The angular velocity is adjusted to the measuring distance or pulse delay in each case. As a result, savings can be made, i.e. on the longitudinal and latitudinal lines, the antennas need not be so close together, so that the number of antennas can be considerably reduced.

What is claimed is:

1. An antenna comprising a plurality of lens elements arranged over a spherical surface, said lens elements being combined in an axial direction adjacent one another to form a spherical-shaped narrow strip, said strip being arranged so as to transmit and receive electromagnetic radiation.

2. An antenna as claimed in claim 1, wherein said strip is extended in width and length by arrangement of a plurality of additional adjacent lens elements.

3. An antenna, as claimed in claim 1, wherein said lens elements comprise diaphanous bubbles filled with a material transparent to said electromagnetic radiation frequency with the bubbles being surrounded by other bubbles in contacting relation therewith and having a hexagonal shape in at least one plane.

4. An antenna as claimed in claim 1, wherein the frequency limits of said electromagnetic radaition lie between the optical frequencies as an upper limit and microwave frequencies as a lower limit.

5. An antenna as claimed in claim 1, used for transmitting electromagnetic radiation only and being physically rotated for controlling the direction of the transmission of said radiation, combined with a receiving antenna comprising:

a plurality of stationary antennas disposed on a prescribed geometrical surface, the optical axis of each antenna being disposed at a solid angle with respect to the optical axes of the other antennas and intercepting a single base point; and means for effecting cyclical scanning of said plurality of antennas, wherein said geometrical surface is that of a plurality of spherical sections having different diameters, which are subdivided along the same longitudinal and latitudinal lines, at the intersection of which said antennas are disposed.

6. An antenna, as claimed in claim 5, wherein said lens elements comprise diaphanous bubbles filled with a material transparent to said electromagnetic radiation frequency with the bubbles being surrounded by other bubbles in contacting relation therewith and having a hexagonal shape in at least one plane.

7. An antenna as claimed in claim 6, further comprising:

laser optical frequency source means for providing an electromagnetic beam of optical frequency;

means for providing an amplitude modulated radio frequency signal in accordance with an information signal to be transmitted;

intensity modulator means having said radio frequency signal as its modulation input for modulating said electromagnetic beam;

said optical antenna transmitting said electromagnetic beam;

said receiving antenna including optical antenna system means for receiving said electromagnetic beam;

optical detector means for detecting the outputs of said optical antenna system means receiving said electromagnetic beam and including light conductor distributor means, comprising in spherical form, a plurality of single hexagonal convex lens elements;

band pass filter means for processing the outputs of said optical detector means;

means for combining the outputs of said band pass filter means;

amplifier means for amplifying the outputs of said combining means; and processing means responsive to the outputs of said amplifier means for processing the outputs to extract an information signal.

8. A light conductor distributor, comprising, in spherical form, a plurality of single hexagonal convex lens elements, wherein said distributor distributes electromagnetic radiation, of optical frequencies, to a spherical surface antenna comprising a plurality of lens elements.

9. An apparatus for the transmission of information over a distance by means of electromagnetic waves of optical frequencies comprising:

laser optical frequency source means for providing an electromagnetic beam of optical frequency;

means for providing an amplitude modulated radio frequency signal in accordance with an information signal to be transmitted;

intensity modulator means having said radio frequency signal as its modulation input for modulating said electromagnetic beam;

a pair of optical antenna system means for transmitting and receiving said electromagnetic beam over a distance;

a plurality of optical detector means for detecting the outputs of said optical antenna system means receiving said electromagnetic beam;

a plurality of bandpass filter means for processing the outputs of said optical detectors;

a plurality of addition stage means for combining the outputs of said bandpass filters;

a plurality of distribution amplifier means for amplifying the outputs of said addition stage means; and processing means responsive to the outputs of said distribution amplifier means for processing the outputs to extract said information signal.

10. An apparatus as claimed in claim 9, wherein said processing means comprises:

a plurality of phase shift circuit means for shifting the phase of some of the outputs of said distribution amplifier means;

a first summing amplifier means for scanning the outputs of said phase shifter means;

a plurality of delay network means for time delaying some of the outputs of said distribution amplifier means;

a second summing amplifier means for summing the outputs of said delay network means;

a third summing amplifier means for summing the outputs of said first and second summing amplifier means;

a means for demodulating the output of said third summing amplifier means to extract said information signal.

11. An apparatus as claimed in claim 9, wherein said processing means comprises:

a first summing amplifier means and a second summing amplifier means for summing the outputs of said distribution amplifier means;

a first phase shifter means and a second phase shifter means for shifting the phase of the outputs of the first and second summing amplifier means, respectively;

a third summing amplifier means for summing the outputs of the first and second phase shifter means;

a means for demodulating the output of said third summing amplifier means to extract said information signal.

12. An apparatus as claimed in claim 9, wherein each of said optical antenna system means comprises antenna lens elements combined in an axial direction adjacent one another to form a spherical shaped narrow strip and each of said lens elements comprise disphanous bubbles filled with a material transparent to said electromagnetic radiation frequency with the bubbles being surrounded by other bubbles in contacting relation therewith and having a hexagonal shape in at least one plane; and wherein said optical detector means are coupled to said antenna elements by means of a light conductor distributor, comprising in spherical form, a plurality of single hexagonal convex lens elements.

* * * * *